United States Patent

Jackson et al.

[11] Patent Number: 4,941,992
[45] Date of Patent: Jul. 17, 1990

[54] N-SUBSTITUTED AMINO ACID DERIVATIVES FOR USE IN LIQUID CRYSTAL MATERIALS AND DEVICES

[75] Inventors: Adam Jackson; Richard M. Scrowston; George W. Gray; David Lacey; Kenneth J. Toyne, all of North Humberside, England

[73] Assignee: The Secretary of State for Defence in Her Britannic Majesty's Government of the United Kingdom of Great Britain and Northern Ireland, London, England

[21] Appl. No.: 93,546

[22] PCT Filed: Oct. 6, 1986

[86] PCT No.: PCT/GB86/00599

§ 371 Date: Jul. 17, 1987

§ 102(e) Date: Jul. 17, 1987

[87] PCT Pub. No.: WO87/02375

PCT Pub. Date: Apr. 23, 1987

[30] Foreign Application Priority Data

Oct. 9, 1985 [GB] United Kingdom ............... 8524879

[51] Int. Cl.$^5$ ................................. C09K 19/12
[52] U.S. Cl. ......................... 252/299.66; 350/350.5; 560/39; 560/41
[58] Field of Search .............. 252/299.01, 299.66; 350/350.5; 560/39, 41

[56] References Cited

U.S. PATENT DOCUMENTS 4,764,619  8/1988  Gunjima et al. ............ 252/299.66
4,784,793  11/1988  Coates et al. .............. 252/299.01
4,824,217  4/1989  Chan et al. ................ 350/350.5

FOREIGN PATENT DOCUMENTS

86/02937  5/1986  PCT Int'l Appl. ........... 252/299.62

Primary Examiner—John F. Terapane
Assistant Examiner—Richard Treanor
Attorney, Agent, or Firm—Stevens, Davis, Miller & Mosher

[57] ABSTRACT

Novel compounds suitable for use as chiral dopants in ferroelectric smectic liquid crystal materials comprising an optically active derivative of an α-amino acid of the formula

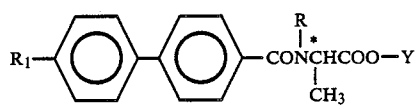

wherein $R_1$ is selected from the group consisting of $C_{1-20}$ alkyl or alkoxy, R is $C_{1-20}$ n-alkyl and Y is $C_{1-20}$ alkyl. A liquid crystal mixture and a device using these compounds are also described.

6 Claims, 7 Drawing Sheets

Route 2

Route 3

Route 5

Route 6

N-SUBSTITUTED AMINO ACID DERIVATIVES FOR USE IN LIQUID CRYSTAL MATERIALS AND DEVICES

The present invention relates to liquid crystal compounds derived from amino acids and to materials and devices using them. In particular the invention relates to the liquid crystal phases of such compounds exhibiting ferroelectric behaviour and to the use of the compounds as dopants to produce mixtures capable of forming phases with ferroelectric properties.

Liquid crystal materials exhibiting a tilted chiral smectic phase have been proposed for use in rapidly switched electro-optical devices, processing and storage devices, based upon the ferroelectric properties of tilted chiral smectic phases, as described for example by N. A. Clark and S. T. Lagerwall in App Phys Lett 36, 899, (1980). (Reference 1).

The liquid crystal materials described in Reference 1, DOBAMC (p-decyloxybenzlidene p-amino 2 methylbutylcinnamate) and HOBACPC (L-4-hexyloxybenyzlidene-4'-amino-2-chloropropylcinnamate) are for most applications far from ideal because they are relatively unstable chemically and sensitive to light, their spontaneous polarisation coefficients (Ps) are relatively small and their tilted smectic phases occur at inconveniently high temperatures and exist over inconveniently small temperature ranges.

It is becoming increasingly common to prepare ferroelectric smectic liquid crystal mixtures by mixing a liquid crystal material that shows a smectic phase, preferably the smectic C (designated Sc) phase as this is the most fluid, with a chiral (optionally active) compound or compounds to induce the smectic phase of the material to become chiral, e.g. $S_c^*$ (the asterisk indicating chirality). The smectic liquid crystal material in this case is termed a 'host' and the chiral compound(s) is termed a 'dopant'. A good dopant should desirably induce a high Ps in the mixture. It is preferred that the dopant also shows a smectic liquid crystal phase as an indication of compatibility with a smectic lattice, but this is not essential.

As the use of ferroelectric smectic liquid crystal materials increases, e.g. in large screen displays of A4 size or larger, it is desirable to decrease the cost of the materials as far as possible. In the case of the chiral dopants the special problems of synthesis of optically pure enantiomers increases their cost.

Biochemical processes are often extremely sterospecific and result in the production of optically pure compounds, with the added advantage that some biochemical products are very cheap. If such biochemical products could be used to make liquid crystal materials it would be very useful. One attempt to achieve this is described in published copending PCT application GB 85/00512 which compounds of lactic acid are discussed, and in UK patent application 8620111 in which derivatives of α-amino acids are discussed. The amino acid derivatives described in that latter patent application contain the grouping —CO.NH.CH(A).COO— where A represents the residue of the amino acid. The presence of the NH group in these compounds is a probable cause of their relatively high melting point.

It is an object of the present invention to identify further useful liquid crystal materials derived from optically active natural products.

According to a first aspect of the invention there is provided a derivative of an α-aminocarboxylic acid, this derivative being optically active and having a general formula I

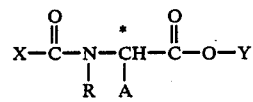

Formula I wherein R is $C_{1-20}$ n-alkyl or n-acyl, wherein A is selected from the following groups: $CH_3$, $CH_3(CH_2)_3$, $CH_2OB$, $CH_3CH(CH_3)$, $CH_3CH(OB)$, $BSCH_2$, $CH_3CH(CH_3)CH_2$, $CH_3CH_2CH(CH_3)$, $CH_3SCH_2CH_2$,

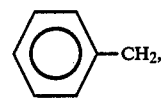

BO

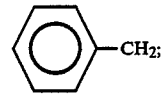

$BOOCCH_2$,   $BOOCCH_2CH_2$,   $B_2NCOCH_2$,
$B_2NCOCH_2CH_2$,                 $B_2NCH_2CH_2CH_2$,
$B_2NCH_2CH_2CH_2CH_2$,

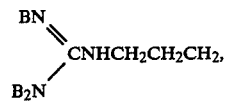

or

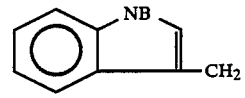

in which B represents a group containing no hydrogens which might give strong hydrogen bonding wherein X and Y are independently groups of general formula II

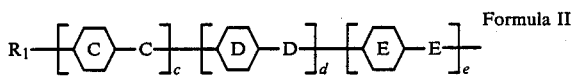

Formula II wherein $R_1$ is selected from hydrogen, halogen or C1-20 alkyl, alkoxy, fluoroalkyl, fluoroalkoxy, alkoxy substituted alkyl, alkyl carbonyloxy and alkoxycarbonyloxy, wherein each of the links C, D and E is independently selected from a single bond, COO, OOC, $CH_2CH_2$, $CH_2O$, $OCH_2$, CH=N, and N=CH, wherein each of the cyclic groups

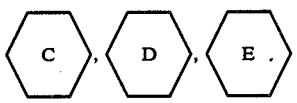

is independently selected from optionally substituted phenyl, trans-cyclohexyl, pyridyl, pyrimidyl, dioxan, piperidine, piperazine and bicyclo (2,2,2) octane, wherein each of c, d and e is independently 0 or 1, and (c+d+e) in X plus (c+d+e) in Y is 2, 3 or 4 provided that in Y, E may be a group $(CH_2)_n$ where n is in the range 0 to 12.

Many of the compounds of Formula I may be used as chiral dopants in ferroelectric smectic liquid crystal mixtures with hosts, as described above, and suitability for such use is among the factors influencing the structural and other preferences discussed below.

The groups A are residues of naturally occuring α-amino acids and their derivation is shown in table 1, where the residue shown in the right hand column is the side chain extending from the chiral centre to which are attached the α-amino and carboxylic acid functions that form the amide and ester links shown in Formula I. Some of the residues shown in table I contain functional groups, e.g. —OH in serine, —SH in cysteine, —COOH in aspartic acid —NH in tryptophan and —$NH_2$ in ornithine. The hydrogen atoms present in these residue functional groups may in some case take part in hydrogen bonding which can increase the melting point of the compounds incorporating them which may be detrimental to liquid crystal use and thus the groups B are introduced to reduce or prevent completely the possibility of hydrogen bonding. As well as possibly presenting the problem of hydrogen bonding, the presence of these functional groups in the α-amino acid side chains may also be used instead of or in addition to the α-amino and carboxylic acid functional groups attached to the chiral centre for bonding to the groups X and Y.

TABLE 1

| NAME | FORMULA | RESIDUE A |
|---|---|---|
| | NATURALLY OCCURING α-AMINO ACIDS. | |
| GLYCINE | $H_2N.CH_2.CO_2H$ | H |
| α-ALANINE | $CH_3.CH(NH_2)CO_2H$ | $CH_3$ |
| SERINE | $CH_2OHCH(NH_2)CO_2H$ | $CH_2OH$ |
| VALINE | $CH_3.CH.(CH_3)CH(NH_2)CO_2H$ | $(CH_3)_2CH$ |
| THREONINE | $CH_3.CH(OH)CH(NH_2)CO_2H$ | $CH_3.CHOH$ |
| CYSTEINE | $HSCH_2CH(NH_2)CO_2H$ | $HSCH_2$ |
| LEUCINE | $CH_3CH(CH_3)CH_2CH(NH_2)CO_2H$ | $(CH_3)_2CHCH_2$ |
| ISOLEUCINE | $CH_3.CH_2CH(CH_3)CH(NH_2)CO_2H$ | $CH_3.CH_2.CH(CH_3)$ |
| METHIONINE | $CH_3SCH_2CH_2CH(NH_2)CO_2H$ | $CH_3SCHCH_2$ |
| PHENYLALANINE | Ph-$CH_2CH(NH_2)CO_2H$ | Ph-$CH_2$ |
| TYROSINE | HO-Ph-$CH_2CH(NH_2)CO_2H$ | HO-Ph-$CH_2$ |
| TRYPTOPHAN | indole-$CH_2CH(NH_2)CO_2H$ | indole-$CH_2$ |
| ASPARTIC ACID | $HOOCCH_2CH(NH_2)CO_2H$ | $HOOC.CH_2$ |
| GLUTAMIC ACID | $HOOC.CH_2CH_2CH(NH_2)CO_2H$ | $HOOC.CH_2CH_2$ |
| ASPARAGINE | $H_2NCOCH_2CH(NH_2)CO_2H$ | $H_2NCOCH_2$ |
| GLUTAMINE | $H_2NCO(CH_2)_2CH(NH_2)CO_2H$ | $H_2NCO(CH_2)_2$ |
| ORNITHINE | $H_2N(CH_2)_3CH(NH_2)CO_2H$ | $H_2N(CH_2)_3$ |
| LYSINE | $H_2N(CH_2)_4CH(NH_2)CO_2H$ | $H_2N(CH_2)_4$ |
| ARGININE | $HN=C(NH_2)NHCH_2CH_2CH_2CH(NH_2)CO_2H$ | $HN=C(NH_2)NHCH_2CH_2CH_2$ |

Therefore according to a further aspect of the invention there is provided a derivative of an α-aminocarboxylic acid, being optically active and having a general formula III:

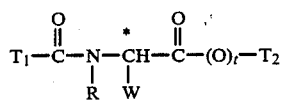

Formula III wherein R is $C_{1-20}$ n-alkyl or n-acyl,
wherein t is 0 or 1, and either $T_1$ represents a group of general formula II t=o and $T_2$ represents a group —$OR_2$, $NHR_3$ or $NR_3R_4$ where $R_2$, $R_3$ and $R_4$ represent unbranched or branched or chiral alkyl groups having 1 to 20 carbon atoms or t=1 and $T_2$ represents a group of general formula II and $T_1$ represents an unbranched or branched or chiral alkyl group having 1 to 20 carbon atoms and wherein W is selected from the following groups:
T₃COOCH₂, CH₃CH(OOCT₃), T₃SCH₂,

T₃COOCH₂, CH₃CH(OOCT₃), T₃SCH₂,

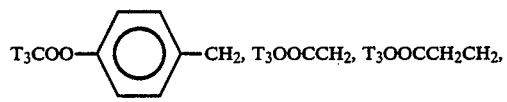

T₃CONBCH₂CH₂, T₃CONBCH₂CH₂CH₂,

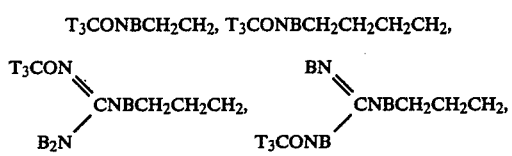

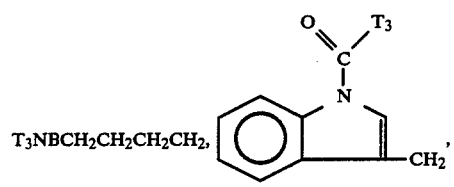

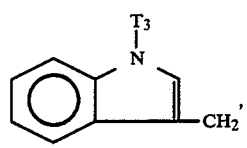

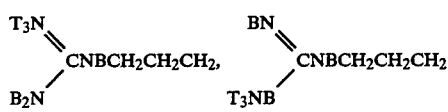

in which T₃ represents a group of general formula II and B may be hydrogen or a group as defined above, the sum of (c+d+e) in all the groups T₁, T₂ and T₃ together being 2, 3 or 4.

In formulae I and III above, R is preferably a lower, e.g. C₁₋₅ n-alkyl or n-acyl group, especially methyl.

The group B in formulae I and III above may be any organic group which contains no hydrogen atoms likely to form strong hydrogen bonds. Preferred B groups are alkyl, preferably C1-20 n-alkyl especially methyl, for substitution onto —OH, —SH, =NH or —NH₂ functional groups in the residue A. Another preferred group for substitution onto —OH, =NH or —NH₂ functional groups in the residue A is acyl, i.e. R—CO— where R is C1-20 alkyl, preferably n-alkyl especially methyl, which forms ester or amide groups with these functional groups, e.g. with the —NH₂ functional group in residue A derived from ornithine.

It is of course preferred to avoid the use of a group B in compounds of Formula I altogether by the use of an α-amino acid residue that contains no functional groups, such as α-alamine, valine, leucine, isoleucine or phenylalamine.

Concerning the group of formula II, when a cyclic group is pyrimidine it is preferably a 2,5-linked 1,3-pyrimidine, when a dioxan it is preferably a trans-dioxan. When a cyclic group is a substituted cyclohexane substituents are preferably in the 1 and/or 4 positions e.g.

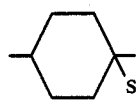

where S is a substituent. Preferred substituents on the cyclic groups are CH₃, CF₃, CN, F, Cl, Br or COCH₃, especially F. On a cyclic group linked to the CO or COO groups of Formula I or III substituents are preferably on the ring positions adjacent to the CO or COO group, by means of which the mesogenic (liquid crystal forming) group of Formula II is sterically hindered from rotation relative to the chiral centre. When R₁ is other than H it is preferably an unbranched organic chain of 1-20 carbon atoms. When two groups of formula II are present in a compound of formula I or III, e.g. X and Y, T₁ and T₃ or T₂ and T₃ they may have the same or different structures encompassed by the possibilities of formula II.

The total of (c+d+e) in the groups of formula II in a compound of formula I or III is preferably 2 or 3. The group C, D or E linking the group of formula II to the CO unit of the α-aminoacid is preferably a single bond.

Examples of preferred combinations of X and Y, of T₁ and T₃, and T₂ and T₃ in formula I and III are listed in table 2 below where each Ph represents optionally substituted phenyl, each $C_y$ represents optionally substituted trans-cyclohexane, each BCO represents bicyclo (2,2,2) octyl, each Py represents pyridine or 2,5-linked 1,3-pyrimidine and each Dx represents 2,5-linked 1,3-dioxane. Each group R₁ in table 2 is idependently selected from the groups from which R₁ in formula II may be selected, may be the same or different and are preferably both n-alkyl or n-alkoxy.

TABLE 2

| Preferred X, T₁, T₂ | Peferred Y, T₃ |
|---|---|
| R₁—Ph—Ph— | —R₁ |
| R₁—Cy—Ph— | —R₁, |
| R₁—Ph—CO₂—Ph— | —R₁ |
| R₁—Ph—CH₂.CH₂—Ph— | —R₁ |
| R₁—Cy—CO₂—Ph— | —R₁ |
| R₁Cy—CH₂.CH₂—Ph— | —R₁ |
| R₁—Ph—Ph—Ph— | —R₁ |
| R₁—Cy—Ph—Ph | —R₁ |
| R₁—Ph—Ph—CO.O—Ph— | —R₁ |
| R₁—Cy—CO.O—Ph—Ph— | —R₁ |
| R₁—Cy—Ph—CO.O—Ph— | —R₁ |
| R₁—Cy—CH₂.CH₂—Ph—Ph— | —R₁ |
| R₁—Cy—CH₂—CH₂—Ph—CO₂—Ph— | —R₁ |
| R₁—Cy—CO₂—Ph—Ph—Ph— | —R₁ |
| R₁—Cy—CH₂.CH₂—Ph—Ph—Ph— | —R₁ |
| R₁—Ph—CO₂—Ph—CO₂—Ph— | —R₁ |
| R₁—Ph— | —Ph—R₁ |
| R₁—Ph—Ph— | —Ph—R₁ |
| R₁—Ph—CO₂—Ph— | —Ph—R₁ |

TABLE 2-continued

| Preferred X, $T_1$, $T_2$ | Peferred Y, $T_3$ |
|---|---|
| $R_1$—Cy—Ph— | —Ph—$R_1$ |
| $R_1$—Cy—$CO_2$—Ph— | —Ph—$R_1$ |
| $R_1$—Cy—$CH_2.CH_2$—Ph— | —Ph—$R_1$ |
| $R_1$—Ph— | —Ph—Ph—$R_1$ |
| $R_1$—Ph—Ph— | —Ph—Ph—$R_1$ |
| $R_1$—Cy—Ph— | —Ph—Ph—$R_1$ |
| $R_1$—Cy—$CO_2$—Ph— | —Ph—Ph—$R_1$ |
| $R_1$—Cy—$CH_2.CH_2$—Ph— | —Ph—Ph—$R_1$ |
| $R_1$—Ph— | —Ph—Ph—$R_1$ |
| $R_1$—Ph— | —Ph—$CO_2$—Ph—$R_1$ |
| $R_1$—Ph— | —Ph—Ph—$CO_2$—Ph—$R_1$ |
| $R_1$—Ph— | —Ph—$CO_2$—Ph—Ph—$R_1$ |
| $R_1$—Ph— | —Ph—Ph—$CO_2$—Ph—Ph—$R_1$ |
| $R_1$—Cy—Ph— | —Ph—Ph—$R_1$ |
| $R_1$—BCO—Ph— | —Ph—$R_1$ |
| $R_1$—BCO—Ph— | —$R_1$ |
| $R_1$—BCO—C.OO—Ph— | —Ph—$R_1$ |
| $R_1$—BCO.C.OO—Ph— | —$R_1$ |
| $R_1$—BCO—$CH_2.CH_2$—Ph— | —$R_1$ |
| $R_1$—BCO—$CH_2O$—Ph— | BCO—$R_1$ |
| $R_1$—Ph— | —BCO—$R_1$ |
| $R_1$—Ph—Ph— | —BCO—$R_1$ |
| $R_1$—Py—Ph— | —$R_1$ |
| $R_1$—Py—$CH_2.CH_2$—Ph— | —$R_1$ |
| $R_1$—Py—CO.O—Ph— | —$R_1$ |
| $R_1$—Dx—Ph— | —$R_1$ |
| $R_1$—Dx—$CH_2.CH_2$—Ph— | —$R_1$ |
| $R_1$—Ph— | —Cy—$R_1$ |
| $R_1$—Ph—Ph— | —Cy—$R_1$ |
| $R_1$—Ph—CO.O—Ph— | —Cy—$R_1$ |
| $R_1$—Ph—Cy—$Ch_2.CH_2$—Ph— | —$R_1$ |
| $R_1$—Ph—Cy—CO.O—Ph— | —$R_1$ |
| $R_1$—Ph—Ph—CO.O—Ph—Ph— | —$R_1$ |
| $R_1$—Py— | —Ph—$R_1$ |
| $R_1$—Ph— | —Cy—Cy—$R_1$ |
| $R_1$—Ph— | —Dx—$R_1$ |
| $R_1$—Ph— | —Ph—Cy—$R_1$ |
| $R_1$—Ph— | —BCO—$R_1$ |
| $R_1$—Ph— | —Ph—BCO—$R_1$ |
| $R_1$—Ph— | —Cy—Dx—$R_1$ |
| $R_1$—Ph— | —Cy—O.OC—Ph—$R_1$ |
| $R_1$—Ph— | —Py—$R_1$ |
| $R_1$—Ph— | —Cy—Ph—$R_1$ |
| $R_1$—Ph— | —BCO—Ph—$R_1$ |
| $R_1$—Ph— | —Py—Py—$R_1$ |
| $R_1$—Ph— | —Ph—O.OC—Ph—$R_1$ |
| $R_1$—Ph— | —Ph—$CH_2.CH_2$—Ph—$R_1$ |
| $R_1$—Ph— | —Ph—$OCH_2$—Cy—$R_1$ |
| $R_1$—Ph— | —Ph—$CH_2.CH_2$—Cy—$R_1$ |
| $R_1$—Ph— | —Ph—N=CH—Ph—$R_1$ |
| $R_1$—Ph— | —Ph—O.OC—Ph—Ph—$R_1$ |
| $R_1$—Ph— | —Ph—O.OC—Ph—Cy—$R_1$ |
| $R_1$—Ph— | —Ph—O.OC—Cy—Ph—$R_1$ |
| $R_1$—Ph— | —Ph—$CH_2.CH_2$—Cy—Ph—$R_1$ |
| $R_1$—Ph— | —Ph—$CH_2.CH_2$—Ph—Ph—$R_1$ |
| $R_1$—Ph— | —Ph—Ph—$CH_2.CH_2$—Ph—$R_1$ |
| $R_1$—Ph— | —Ph—Ph—$CH_2.CH_2$Cy—Ph—$R_1$ |
| $R_1$—Ph— | —Ph—Ph—Ph—$R_1$ |
| $R_1$—Ph— | —Dx—$CH_2.CH_2$—Cy—$R_1$ |
| $R_1$—Ph— | —Cy—N=CH—Ph—$R_1$ |
| $R_1$—Ph— | —BCO—$CH_2.CH_2$—Ph—$R_1$ |
| $R_1$—Ph— | —Cy—O.OC—Ph—Ph—$R_1$ |
| $R_1$—Ph— | —Cy—O.OC—Ph—Ph—$R_1$ |
| $R_1$—Ph— | —Cy—Ph—$OCH_2$—Cy—$R_1$ |
| $R_1$—Ph— | —Cy—Ph—O.OC—Ph—Ph—$R_1$ |
| $R_1$—Ph— | —Ph—Ph—O.OC—Ph—Ph—$R_1$ |
| $R_1$—Ph— | —Ph—Ph—CO.O—Ph—Ph—$R_1$ |
| $R_1$—Ph— | —Cy—Ph—Ph—$R_1$ |

In X or $T_1$ $R_1$ is preferably n-alkyl or n-alkoxy containing 5 to 12 carbon atoms. In Y or $T_2$ $R_1$ is preferably n-alkyl containing 1 to 12 carbon atoms.

Some particularly preferred combinations of X and Y in formula I are shown in table 3 where $R_A$ represents C5-12 n-alkyl or n-alkoxy, $R_B$ represents n-alkyl containing 1-12 carbon atoms especially ethyl, butyl or hexyl, Rc represents n-alkyl or n-alkoxy containing 1-12 carbon atoms, especially ethyl, butyl, hexyl, ethoxy, butyloxy, or hexyloxy. A is as defined above, especially $CH_3$, $CH_3$ $CH(CH_3)$, $CH_3$ $CH(CH_3)CH_2$, $CH_3CH_2CH(CH_3)$, or

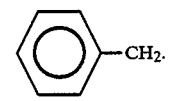

Similarly some particularly preferred groups from which $T_1$, $T_2$ and $T_3$ may be selected are listed in table 4 below, where $R_A$, $R_B$ and $R_C$ are as defined with respect to table 3.

TABLE 3

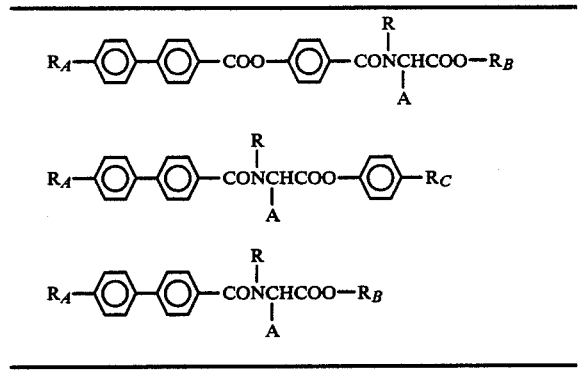

TABLE 4

| $T_1$ | $T_2$ | $T_3$ |
|---|---|---|
| 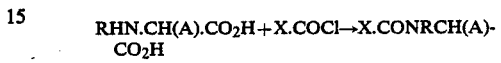 | $R_B$ | $R_B$ |
|  | $R_B$ | 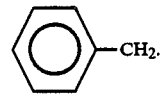—$R_C$ |
| 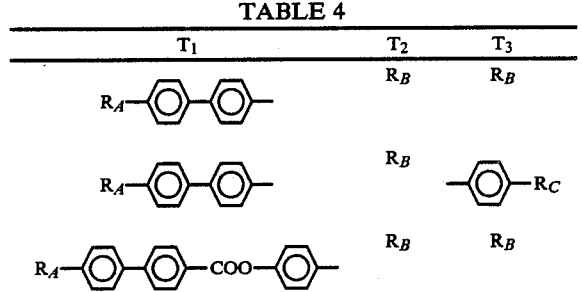 | $R_B$ | $R_B$ |

The compounds of Formulae I and III may be prepared using the following preparative routes.

It is convenient to prepare the compounds of Formulae I and III from naturally occurring preferably commercially available α-amino carboxylic acids, preferably one possessing a chiral centre, e.g. alanine, serine, valine, threonine, cysteine, leucine, isoleucine, methionine, phenylalanine, tyrosine, tryptophan, aspartic acid, glutamic acid, asparagine, glutamine, ornithine, lysine, arginine and cystine.

It will be noted that serine, threonine and tyrosine contain functional hydroxy (—OH) groups in side chains, aspartic acid and glutamic acid contain funtional carboxylic acid (CO$_2$H) groups in side chains, asparagine and glutamine contain functional amide (—CONH$_2$) groups in side chains, ornithine, lysine and arginine contain functional amino (—NH$_2$) groups in side chains and cysteine has a functional mercapto (—SH) group in its side chain.

When the compounds of formulae I and III are prepared in this way from a naturally occuring α-amino acid it is necessary at some stage to add the group R by substitution onto the α—NH$_2$ position of the amino acid. This may be performed at any stage in the preparation provided that other vulnerable sites in the molecule are blocked by a protecting group where necessary, but it is most convenient to add the group R to the α—NH$_2$ position of the starting amino acid before addition of the groups X and Y of formula I, or $T_1$, $T_2$ or $T_3$ of formula III.

Many literature routes are known for the addition of the group R onto the α—NH$_2$ position of an α-amino acid. For example alkylation, in particular methylation may be carried out by the method of E. Fischer and W. Lipschitz, Chemische Berichte (1915), p 360–378. In this reference the preparation of N-methylalanine, N-methylleucine, N-methylphenylalanine and N-methyltyrosine are described.

Using this procedure, when the group R has been added, compounds of formula I may be prepared from the N-substituted amino acid by extension of both the amino and carboxylic acid termini.

Extension of the amino group may be achieved by Route 1 below:

$$RHN.CH(A).CO_2H + X.COCl \rightarrow X.CONRCH(A)\text{-}CO_2H$$

where X, R and A are defined above and A represents the remainder of the α-amino acid residue. For example X may be 4-alkyl- or 4-alkoxy-phenyl or 4'-alkyl- or 4'-alkoxy-biphen-4-yl and A may be —CH$_3$, —CH$_2$OH or

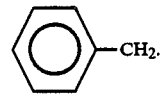

Figure 1:
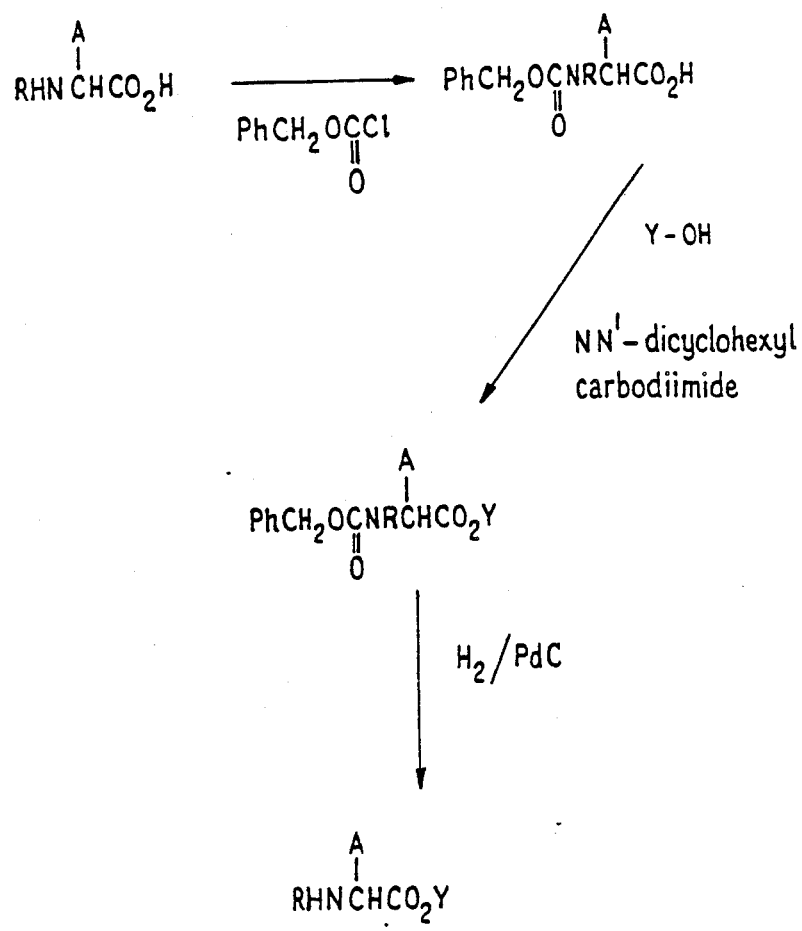
FIGS. 1 to 6 show preparative routes to the derivatives of the present invention.

The method used for the extension of the carboxylic terminus depends upon whether the acid contains any functional groups in a side chain. If there are no functional groups in the side chain, for example as is the case with alanine, valine, leucine, iso leucine, methionine and phenylalanine, then the carboxylic group may be extended by the method of Route 2 illustrated in FIG. 1 of the accompanying drawings where Y is as defined above and A represents the remainder of the α-amino acid residue. For example Y may be 4-alkyl- or 4-alkoxy-phenyl or 4'-alkyl-or 4'-alkoxy-biphen-4-yl and A may be CH$_3$. CH.(CH$_3$).CH$_2$.(leucine) or

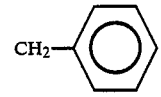

(phenylalanine).

Figure 2:
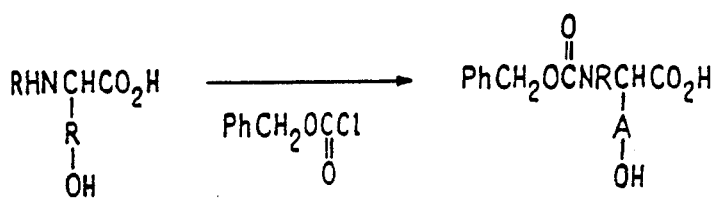
Figure 2:
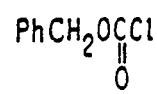
Figure 2:
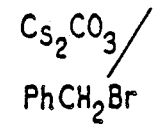
Figure 2:
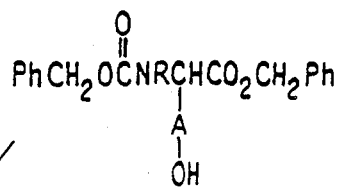
Figure 2:
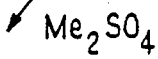
Figure 2:
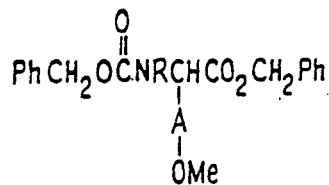
Figure 2:
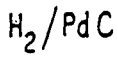
Figure 2:
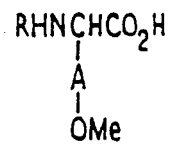

If there are functional hydroxyl groups in a side chain then before extension of the carboxylic terminus they may be protected by an appropriate blocking group B as defined above. The most convenient blocking group is methyl (CH$_3$) and blocking may be achieved by Route 3 illustrated in FIG. 2 of the accompanying drawing in which A represents the remainder of the α-amino acid residue. It will be noted that the amino and carboxylic termini are themselves temporarily protected by blocking groups which are subsequently removed. R in Route 3 may for example be CH$_2$ (serine) or

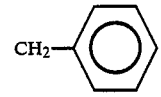

(tyrosine). After protection the α-amino carboxylic acid may have its amino and carboxylic termini extended by Route 1 and Route 2 above.

Figure 3:
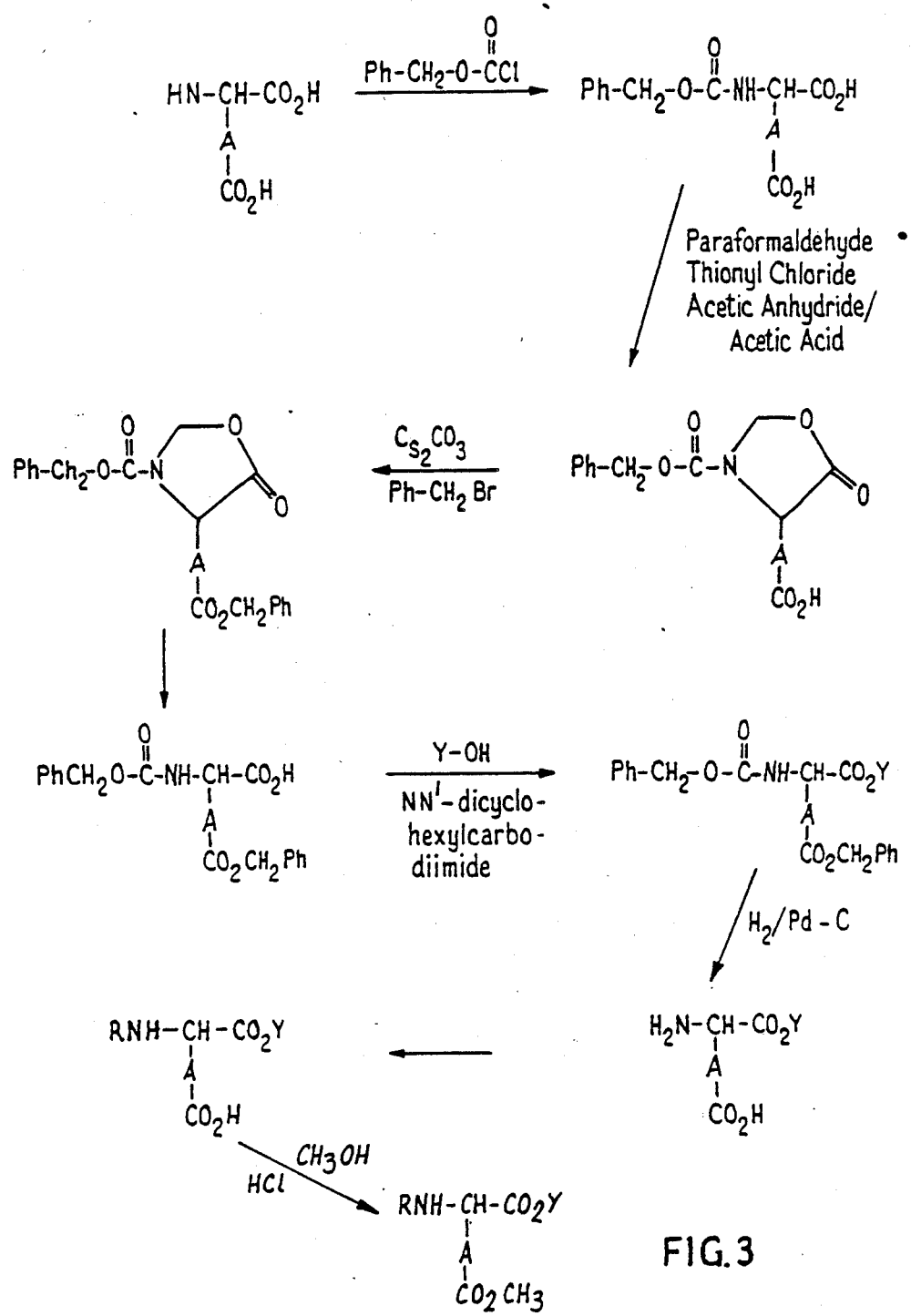

If there are functional carboxylic (—CO$_2$H) groups in a side chain of the α-amino carboxylic acid then extension of both the carboxylic functions is possible. To prepare a compound of Formula I from such a dicarboxylic acid then selective blocking and unblocking procedures must be performed on the carboxyl groups. This can conveniently be achieved by proceeding via the oxazolinone in Route 4 illustrated in FIG. 3, where Y is defined above and A represents the remainder of the amino acid residue, e.g. CH$_2$ (aspartic acid). As the N of the amino acid is involved in formation of the oxazoline ring in this route, it is more convenient in this case to add the group R to the N after Y has been added, as shown in route 4. The amino terminus may then be extended as in route 1, and the β-carboxylic acid group blocked by a group B, e.g. methyl, as shown in route 4.

Compounds of Formula III may be prepared by extension of either the amino terminus or the carboxylic terminus as appropriate, and a functional group in a side chain on the α-amino acid residue.

When the α-amino acid contains a hydroxyl group in a side chain the amino or carboxylic acid termini may be extended by appropriate combinations of Routes 1, 2 and 3 above. However if the side chain contains an hydroxyl group, then it is necessary to protect for example the α-amino carboxylic acid against internal esterification by protecting the carboxyl group when the hydroxyl group is extended and vice versa.

Figure 4:
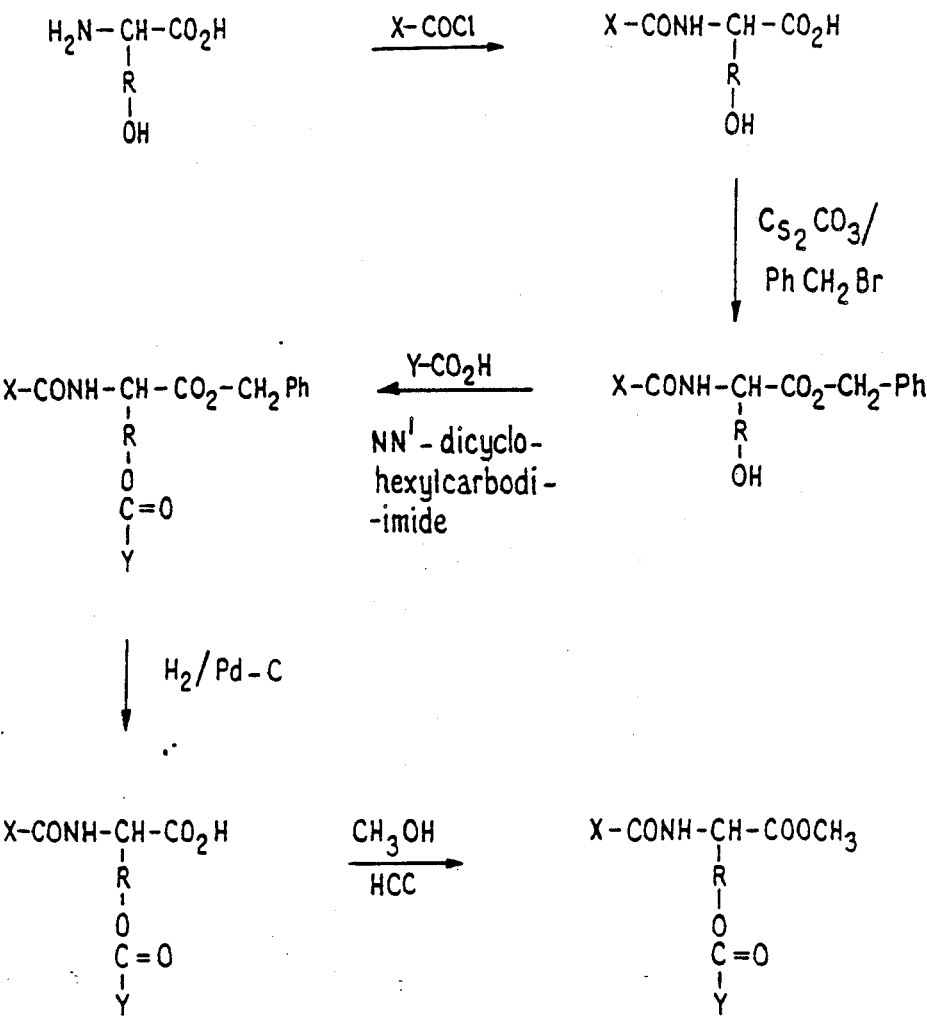

An example of a suitable route for preparation of a compound of Formula III in which the amino terminus and the side chain hydroxyl group of an α-amino carboxylic acid are extended, based upon Routes 1 to 3 above is Route 5 illustrated in FIG. 4 of the accompanying drawings in which X and Y are as defined above and R is the α-amino acid residue. For example X may be 4-alkyl- or 4-alkoxy-phenyl or 4'-alkyl - or 4'-alkoxy-biphen-4-yl, Y may be 4-alkyl- or 4-alkoxy-phenyl or 4'-alkyl- or 4'-alkoxy-biphen-4-yl and R may be CH$_2$ or

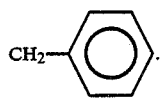

Figure 5:
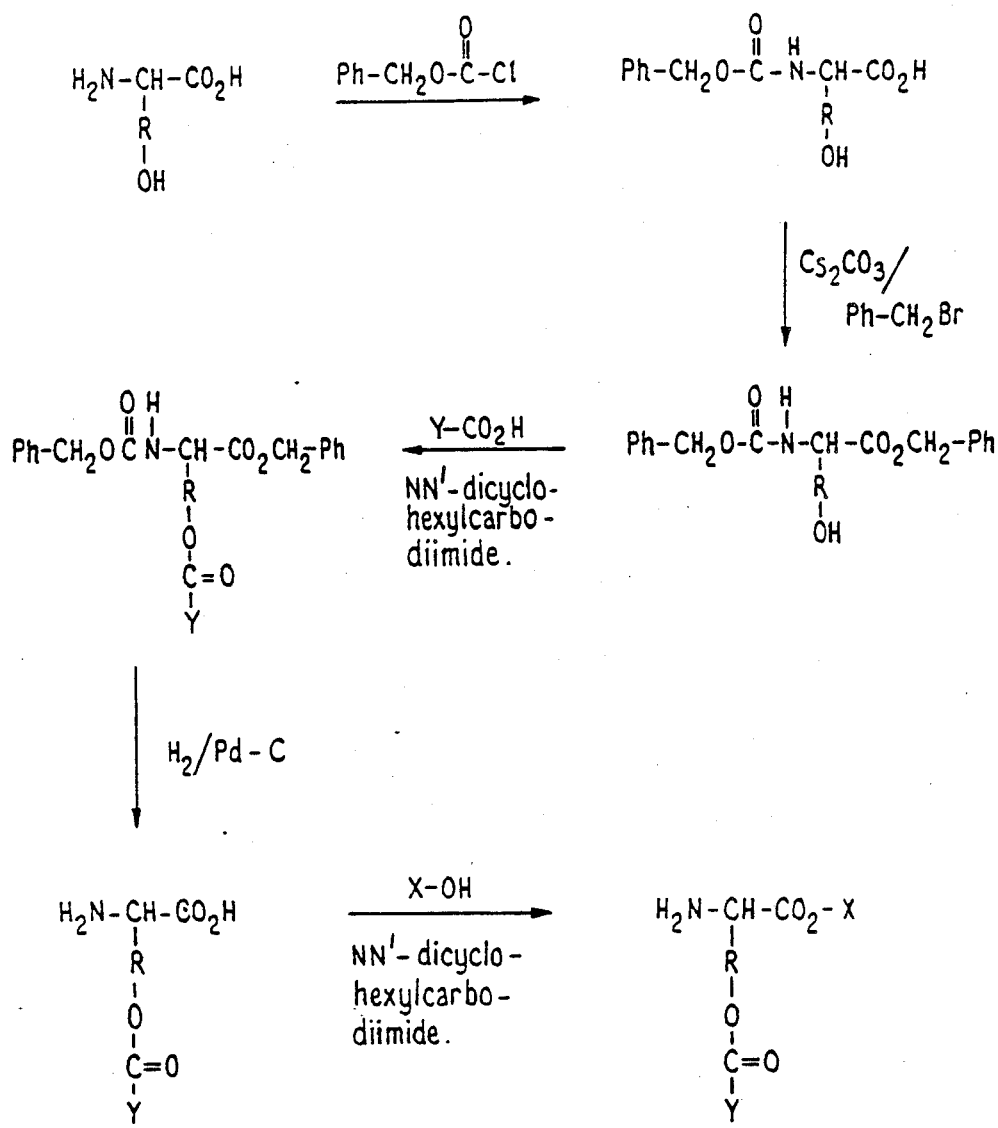

An example of a suitable route for preparation of a compound of Formula III in which the carboxylic acid terminus and the side chain hydroxyl group of an α-amino carboxylic acid are extended, based upon Routes 1 to 3 above is Route 6 illustrated in FIG. 5 of the accompanying drawings in which X and Y are as defined above and R is the α-amino acid residue. X, Y and R may be as in Route 5 above. The amino- group in the product of the final step of Route 5 may be converted into a tertiary damine or an amide group containing no hydrogen atoms likely to engage in strong hydrogen bonding by known methods, such as treatment with an alkyl halide to produce a tertiary amine.

Figure 6:
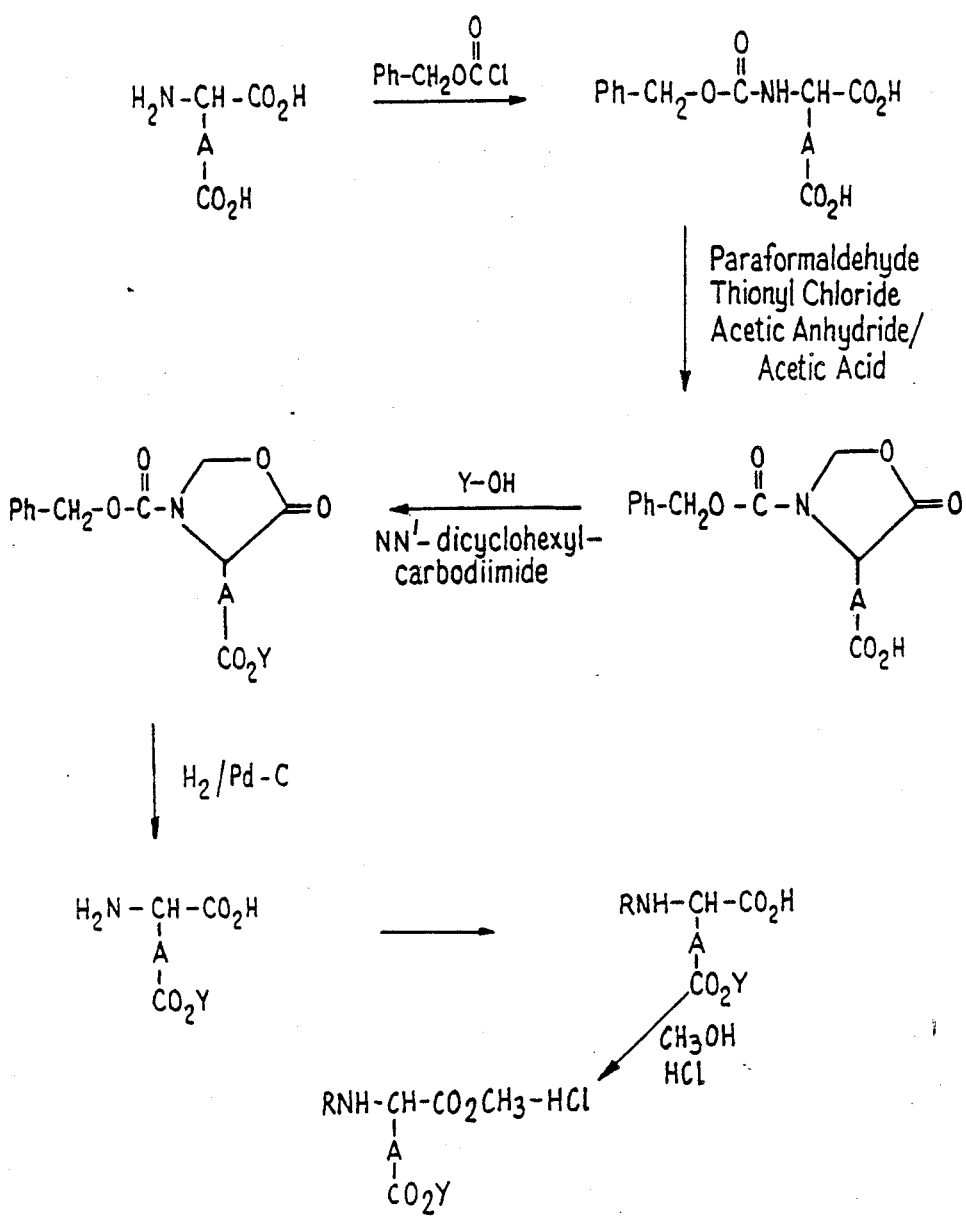

When the α-amino acid contains a carboxylic group in the side chain a compound of formula III may be prepared by extension of that group. The α-carboxylic acid group should be appropriately blocked while the side chain carboxylic group is extended. This may be done via the oxazoline as in Route 7 shown in FIG. 6, where Y is as defined above and A represents the remainder of the amino acid residue. In this case, as in route 4, it is preferable to add the group R after cleavage of the oxazoline. The amino terminus of the product of route 7 may then be extended as in route 1.

Various modifications of the above Routes 1 to 7 above will be apparent to those skilled in the art. Although the various steps involved in Routes 1 to 7 above are not novel, the overall routes and products are novel. Various other methods of making compounds of Formulae I and III will also be apparent to those skilled in the art.

The compounds of Formulae I and III may be isolated in an optically active (chiral) form, in which case the starting amino acid in Routes 1 to 7 is the corresponding (S)- or (R)-isomer, or in a racemic form, in which case the starting amino acid is racemic. Many of the amino acids are commerically available.

Where an optically active product is required from Routes 1 to 7 the intermediate products, as well as the final products, are checked to ensure that their optical activity is not destroyed by racemisation during the preparation.

Many the compounds of formulae I and III, and particularly those which show smectic phases, are useful constituents of ferroelectric smectic liquid crystal mixtures.

Therefore according to a further aspect of the invention there is provided a ferroelectric smectic liquid crystal material, being a mixture of at least two compounds at least one of which is a compound of formula I or III.

Generally compounds of formulae I and III will be suitable as chiral dopants than as smectic hosts, and the ferroelectric smectic liquid crystal mixture may therefore comprise a mixture of at least one compound of formula I or III and a smectic host.

Compounds of formulae I and III may be used as dopants in a wide variety of tilted smectic hosts. Some examples of suitable known hosts are the compounds listed in Table 5 below, or mixtures of them. A particularly preferred series of compounds for use as or in a tilted smectic host is the series of esters described in copending patent application PCT/GB86/OC40, the contents of which are included herein by reference. These esters have the general formula Formula V

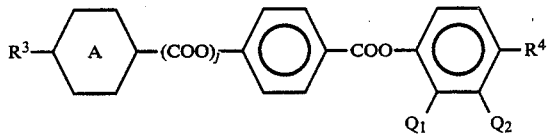

where

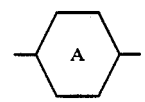

represents 1,4-phenyl or trans-1,4-cyclohexyl, $R^3$ represents $C_{3-12}$ alkyl, alkoxy, alkylcarbonyloxy, alkoxycarbonyl, or alkoxycarbonyloxy, j is 0 or 1, $R^4$ represents $C_{3-12}$ alkyl or alkoxy, one of $Q_1$ or $Q_2$ is H and the other F. Especially preferred esters of Formula V for use in or as a host together with a compound of formula I or III as dopant are those below, where $R^5$ is alkyl or alkoxy:

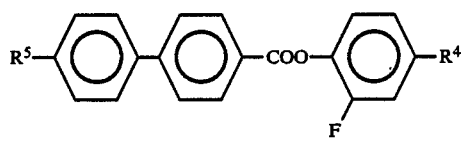

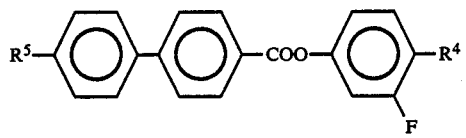

Ferroelectric smectic liquid crystal mixtures containing a compound of formula I or III may contain other chiral dopants. Such other dopants may induce the same or the opposite sense of helical pitch on the chiral smectic phase of the mixture. If the latter, then a mixture may be obtained in some cases which has an infinite pitch

TABLE 5

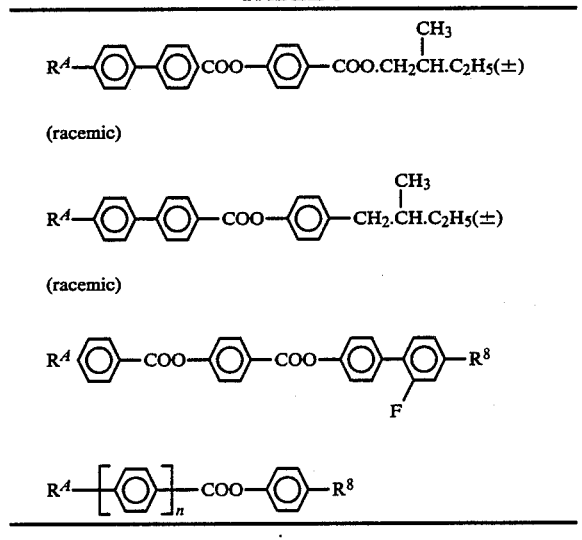

Where $R^4$ and $R^3$ may be $C_1-C_{12}$ n-alkyl or n-alkoxy, e.g. $R^4=C_8H_{17}$ or $C_8H_{17}O$ and $R^3=C_5H_{77}$, and n is 1 or 2.

TABLE 6

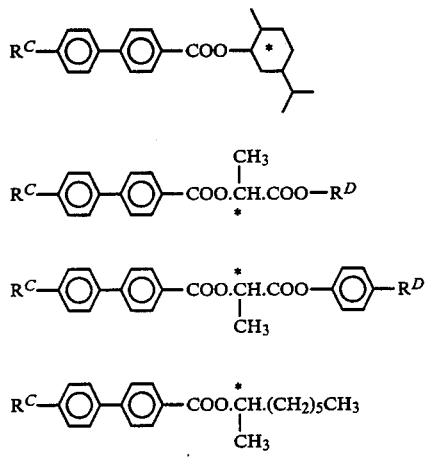

TABLE 6-continued

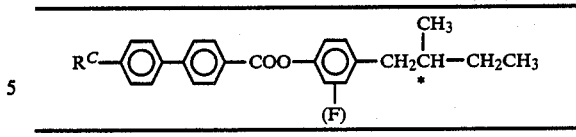

Where $R^C$ may be n-alkyl or n-alkoxy, and $R^D$ may be n-alkyl, or n-alkoxy if not present as $-COOR^D$. $R^C$ and $R^D$ may idenpendently contain 1-12 carbon atoms. (F) indicates that a fluorine substituent may be present. and if the senses of Ps induced by the compound of formula I or III and the dopant are additive, i.e. the same then the mixture may also have a large Ps. Some examples of other known types of dopant which can be used in this way are listed in Table 6.

In addition to a compound of formula I or III, a host, and other chiral dopants which may be present, a ferroelectric smectic liquid crystal material may also contain other known additives to modify or improve its properties if this is considered necessary, such as viscosity, liquid crystal transition temperatures, birefringence etc.

A typical ferroelectric smectic liquid crystal mixture which contains a compound of formula I or III is as follows:

| | |
|---|---|
| Host, eg Table 5 compound, ester of Formula V, or mixtures thereof. | up to 99 wt. % |
| One or more compounds of Formula I or III. | up to 50 wt % (preferably 1 to 30 wt %) |
| Other dopant, eg Table 6 compound | up to 30 wt % |
| Additives to modify properties | up to 30 wt % |
| The total being 100% | |

The actual composition selected will depend upon the properties required. Ps is generally proportional to the amount of chiral dopants present in the mixture, and it is desirable to achieve as high a Ps as possible without compromise of other desirable properties.

Ferroelectric smectic liquid crystal materials incorporating a compound of formula I or III may be used in the known types of electro optic device which use such materials, for example as generally described in Appl. Phys. Lett. 36, (1980) p 899. (Reference 1).

The device may for example be a Clark-Lagerwall device, as described in Reference 1, or in 'Recent developments in condensed matter physics, 4, (1981), p 309 published by Plenum, N.Y.' According to the present invention in a further aspect there is provided a device operating by a ferroelectric effect in a liquid crystal material exhibiting a chiral smectic phase, the device comprising two substrates at least one of which is optically transparent, electrodes on the inner surfaces of the substrates and a layer of the liquid crystal material sandwiched between the substrates, wherein the liquid crystal material comprises at least one compound of Formulae I or III specified above. The device may, for example be a Clark-Lagerwall device.

Examples of the preparation and properties of compounds embodying the present invention will now be described. In the following Examples certain abbreviations and symbols used having the following meanings:

h=hours;
g=grammes;
mp=melting point;

bp=boiling point;
hplc=high pressure liquid chromatography;
C-$S_A$=crystalline solid to smectic A liquid crystal; transition temperature;
$S_A$-I=smectic A liquid crystal to isotropic liquid; transition temperature.
[α]=optical rotation angle (°) Na D line; $CHCl_3$

EXAMPLE 1

Preparation of compounds of structure:

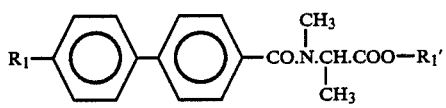

where $R_1$ is n-alkyl or n-alkoxy and $R_1'$ is n-alkyl.

Step 1.

Preparation of N-methylalanine (i.e. where R in formula I is methyl, and A is also methyl).

1A. L-alanine (18 g) was dissolved in aqueous NaOH (110 ml, 2M). Toluolsulphodichloride (76 g) dissolved in diethyl ether (200 ml) was added and the flask was sealed and shaken at room temperature for 1 hr. A further portion of aqueous NaOH (2M, 300 ml) was then added and the flask sealed and shaken for another hour. The ether was evaporated off to leave a yellow aqueous solution which was filtered and acidified with excess 5M HCl. A thick oil formed which crystallised on seeding and standing for 15 hours at 0° C., forming colourless crystalline needles. These were recrystallised from water.

Yield: 33 g (ca. 67%) mpt. 134°–135° C.

1B. The product from 1A above (15 g) was dissolved in aqueous NaOH (125 ml, 2M). Methyl iodide (18 g) was added and the mixture was heated to 65°–68° C. with violent shaking for 20 min. The mixture was then maintained at this temperature without shaking for a further 20 min. before cooling to room temperature and acidifying with excess 5M HCl. An oil formed which rapidly solidified. The solid product was dissolved in aqueous $NaHCO_3$ and reprecipitated by acidification with HCl. This product was then recrystallised from water twice.

Yield: 12 g mpt. 121°–123° C. The product was Toluosulpho-L-N-methylalanine:

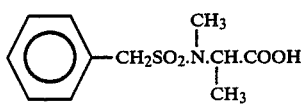

1C. The product from 1B above (20 g) was heated for 8 hr. at 100° C. with HCl (76 ml, d.1.19). The clear yellow solution was then cooled to 0° C. and the Toluolsulphonic acid which crystallised out was filtered off. The filtrate was evaporated at reduced pressure to obtain the hydrochloride of L-N-methylalanine as a brown syrup which crystallised with dificulty, after prolonged standing in a vacuum dessicator, as brown needles. This crude product was dissolved in ethanol (40 ml) by shaking, and then precipitatd out by the gradual addition of diethyl ether, and was then filtered off. Final purification was by recrystallisation from a little ethanol acidified with HCl, followed by drying over $P_2O_5$ in vacuo.

Mpt was 165.5°–166° C.

1D. The methylaminoacid was prepared by heating an aqueous solution of the hydrochloride of 1C with lead oxide PbO, the insoluble lead chloride which formed, and excess PbO being filtered off. The filtrate was evaporated in vacuo to yield colourless needles of the N-methyl alanine. These were recrystallised from ethanol, adding ether to the mother liquor to obtain a further crop of crystals.

Yield: ca. 75%. The product was finally dried and kept in vacuo over $P_2O_5$.

Step 2.

Extension of the α-amino group using route 1.

The appropriate 4-n-alkyl or alkyloxy biphenylyl 4'-carboxylic acid (10 mmol) was stirred for 2–3 hours in dry benzene with oxalyl chloride (29 mmol) and dimethyl formamide (catalytic amount). The benzene solvent and unreacted oxalyl chloride were then removed by vacuum evaporation.

The resulting 4-n-alkyl or alkoxy 4' carbonyl chloride was dissolved in dry dichloromethane (30 ml) and the solution was added dropwise during 20 minutes to a very vigorously stirred solution of L-N-methylalanine (10 mmol) prepared as in step 1 above in saturated aqueous $NaHCO_3$ (100 ml). Stirring was continued for a further 30 minutes, then the solution was acidified and organic material was extracted into dichloromethane (3×50 ml). The combined extracts were dried and evaporated to give the crude amide, which was purified by flash chromatography on silica gel with 3:1 ethyl acetate: petroleum fraction (bpt. 60°–30° C.) as eluant.

Using this method the $C_3H_{17}O$- and $C_9H_{19}$- derivatives were prepared, i.e.:

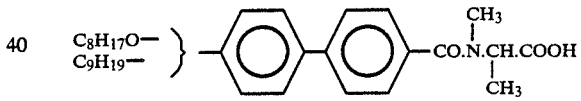

in 60–70% yield.

Step 3.

Extension of the carboxylic acid group as in routes 2, 4, 5, 6, 7. (Ref. A. Hassner and V. Aleanian; Tetrahedron letters, (1973), 4475)

A mixture of the product of step 2 above (10 mmol), NN'-dicylohexylcarbodimide (11 mmol), ethanol (11 mmol), 4-pyrrolidinopyridine (1 mmol) and dichloromethane (50 ml) was stirred at room temperature until the reaction was complete by tlc.

The precipitated NN' dicyclohexylurea was filtered off and the filtrate was washed successively with water (3×50 ml), aqueous 5% acetic acid (3×50 ml) and again with water (3×50 ml). The organic layer was dried and evaporated to give the crude ester, which was purified by column chromatography on silica gel wtih 3:1 ethyl acetate: petroleum fraction (bp 60°–80° C.) as eluant.

Using this method the compounds:

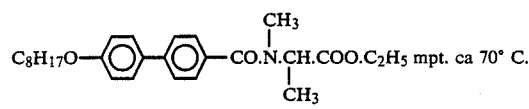

and

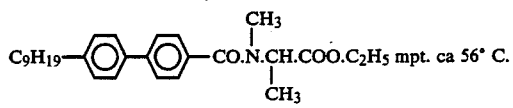

were prepared in ca 85% yield.

The following examples illustrate the use of the various protecting and de-protecting methods. Although the amino acids used contained an amino-group where the NH has not been replaced by NR, there is no chemical reason wy these methods should not be used in amino acids in which NH has been replaced by NR.

EXAMPLE 2

Protection of the α-Amino Group as in Route 2, 3, 4, 6, 7 Ref M. Bergmann and L. Zervas, *Ber.* 1982, 11, 1192

Benzyl chloroformate (15 mmol) was added dropwise during ca 20 minutes to a vigorously stirred solution of serine (10 mmol) in aqueous 10% sodium hydrogen carbonate (50 ml) and stirring was continued for 4 hr.

The solution was cautiously acidified with dilute HCl and any precipitated product was filtered off. The filtrate or the whole solution if no precipitation occurred was then shaken with ether (3×50 ml). Evaporation of the dried ethereal extracts gave the crude product which together with any precipitated product was purified by column chromatography on silica gel and elution with 3:1 ethyl acetate: petroleum fraction (bp 60°–80° C.).

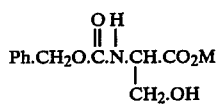

was obtained in 60% yield, mp 117° C.

EXAMPLE 3

Protection of the α-Carboxyl Group as in Route 3, 5, 6 Ref S. S. Wang, *J-Org Chem.* 1976, 41, 3258.

The amino group of serine was protected using benzyl chloroformate as in Example 2 above.

A solution of the protected serine (10 mmol) in the minimum volume of aqueous 80% ethanol was titrated to pH 7 with aqueous 20% caesium carbonate; then the solvent was removed by evaporation at ca 35° C. Last traces of water were removed from the residue by azeotropic distillation of benzene (3X).

A solution of the resulting caesium salt in dry dimethylformamide (50 ml) was stirred for 24 hr with benzyl bromide (1.2 mol equivalents). The precipitated CsBr was filtered off and the solvent removed in vacuo. Addition of water and shaking of the resulting mixture with chloroform (3×50 ml) gave, after evaporation of the dried extracts, the benzyl ester, which was purified by flash chromatography on silica gel and elution with 3:1 ethyl acetate: petroleum fraction (bp 60°–80° C.).

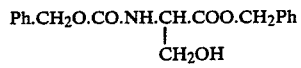

was obtained in 80% yield, mp 77° C.

EXAMPLE 4

De-protection of Amino and Carboxylic acid Groups as in Routes 2, 3, 4, 5, 6, and 7

The products of Examples 2 and 3 containing protected amino-and carboxylic groups were dissolved in the minimum amount of a mixture of ethanol and ethyl acetate (10:1) and hydrogenated in the presence of 7.5% palladised charcoal (50 mg/g) until the uptake of hydrogen had ceased. The catalyst was filtered off and the solvent removed in vacuo, giving the crude product, which was purified by an appropriate procedure (e.g. recrystallisation, chromatography).

Yields were generally 90–100%.

EXAMPLE 5

Blocking of the Hydroxyl Group in the side chain as in Route 3

An α-amino carboxylic acid which had had its terminal amino-and carboxylic acid groups protected as described in Example 2 and 3 (10 mmol) was dissolved in acetone (30 ml) in a three necked round bottomed flask equipped with two dropping funnels, one containing dimethyl sulphate (10 mmol), the other containing aqueous 40% w/v sodium hydroxide (20 ml).

Approximately one third of the sodium hydroxide solution was added to the flask with vigorous stirring, after which time the flask and contents were heated to approx 50° C. Continuing stirring, the remainder of the sodium hydroxide solution and the dimethyl suphate was added dropwise, simultaneously, over a period of 1.5 h. Stirring was continued for a further 30 min, after which time the acetone was removed by distillation under nitrogen. The contents of the flask were poured onto of crushed ice (100 g) and the solid collected by filtration and washed with cold water.

Drying in vacuo and recrystallisation from petroleum fraction (bp 60°–80° C.) yielded the pure methylated product.

EXAMPLE 6

Preparation of an Oxazolinone as in Routes 4 and 7

The amino group of L-aspartic acid was protected as in Example 2 using benzyl chloroformate, to form N-benzyloxycarbonyl-L-aspartic acid.

A mixture of the protected acid (5.35 g), paraformaldehyde (1.8 g), acetic anhydride (4.0 g), acetic acid (75 g) and thionyl chloride (0.3 g) was heated at 100° C. for 4 h. Evaporation of the acetic acid under reduced pressure gave an oily reside which was dissolved in ethyl acetate and shaken with aqueous 5% sodium hydrogen carbonate. The aqueous layer was collected and was carefully acidified, with cooling (0°–5° C.). The aqueous phase was then shaken with ethyl acetate (3×50 ml) and the ethyl acetate extracts washed with water (1×50 ml) and dried (MgSO4). Removal of the solvent gave a pale yellow oily crude product. This was purified by column chromatography on silica gel, using an eluant of chloroform/ethyl acetate 3:1.

The product oxazolinone:

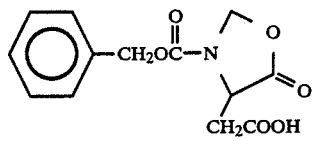

was obtained as an oil; yield 80%.

EXAMPLE 7

Cleavage of the Oxazolinone as in Routes 4 and 7

A solution of the oxazolinone prepared as in Example 6 (1.5 g) in methanol (20 ml) was treated with 1M sodium hydroxide (10 ml) at room temperature for 4 hr. The reaction mixture was then neutralized with 1M hydrochloride acid and the methanol was removed under reduced pressure. The aqueous solution was shaken with ethyl acetate which in turn was shaken with aqueous 5% sodium hydrogen carbonate. This extract was washed with ethyl acetate before being acidified by the addition of 6M hydrochloric acid, and shaken with ethyl acetate.

The organic layer was separated, washed with water and dried ($MgSO_4$). Evaporation of the solvent gave an oily residue which solidified on standing. Recrystallisation from water gave N-benzyloxycarbonyl-L-aspartic acid.

An example of the use of a compound of formula I in a liquid crystal material and device embodying the present invention will now be described with reference to FIG. 7, which is a cross-sectional end view of a liquid crystal shutter.

Figure 7:
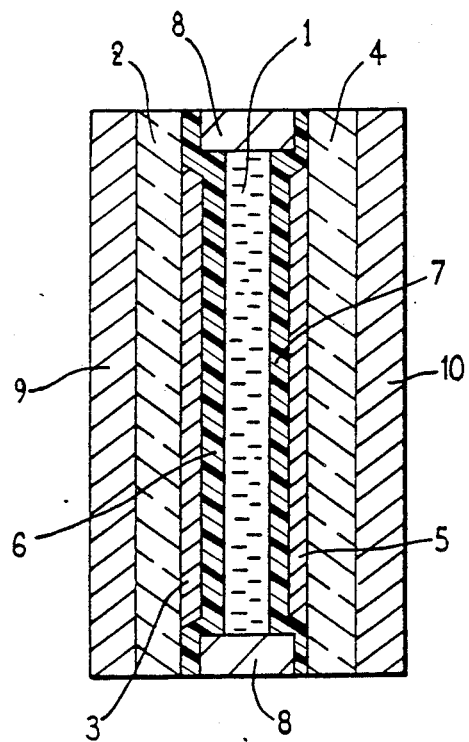
FIG. 7 shows a cross-section through a liquid crystal electro-optical device.

In FIG. 7 a liquid crystal cell comprises a layer 1 of liquid crystal material exhibiting a chiral smectic phase sandwiched between a glass slide 2 having a transparent conducting layer 3 on its surface e.g. of tin oxide or indium oxide, and a glass slide 4 also having a transparent conducting layer 5 on its surface. The slides 2, 4 with the layers 3, 5 are coated by films 6, 7 of a polyimide polymer. Prior to construction of the cell the films 6, 7 of a polyimide polymer. Prior to construction of the cell the films 6, 7 are rubbed with a soft tissue in a given direction the rubbing directions being arranged parallel on assmebly of the cell. A spacer 8, e.g. of polymethylmethacrylate, separates the slides 2, 4 to a required distance e.g. 5 microns. The material is introduced between the slides 2, 4 by filling the space between the slides 2, 4 and spacer 8 and sealing the spacer 8 in a vacuum in a known way.

A suitable material 1 is:

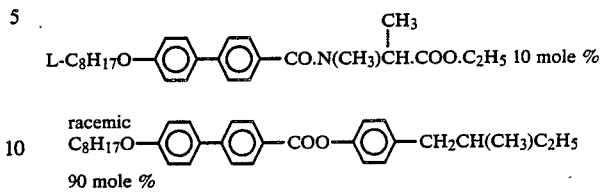

A polariser 9 is arranged with its polarisation axis parallel to the rubbing direction of the films 6, 7 and an analyser (crossed polariser) 10 is arranged with its polarisation axis perpendicular to that rubbing direction.

When a square wave voltage (from a conventional source not shown) varying between about $-10$ volts and $-10$ volts is applied across the cell by making contact with the layers 3, 4 the cell is rapidly switched upon the change in sign of the voltage between a dark state and a light state.

We claim:

1. An optically active derivative of an alpha-aminocarboxylic acid having the formula I:

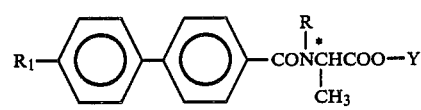

where $R_1$ is selected from the group consisting of $C_{1-20}$ alkyl or alkoxy, R is $C_{1-20}$ n-alkyl and Y is $C_{1-20}$ alkyl.

2. A derivative as claimed in claim 1 wherein $R_1$ is selected from the group consisting of $C_{5-12}$ n-alkyl or n-alkoxy, R is $C_{1-5}$ n-alkyl and Y is $C_{1-12}$ n-alkyl.

3. A derivative as claimed in claim 2 wherein Y is selected from the group consisting of ethyl, n-butyl and n-hexyl.

4. A derivative as claimed in claim 1, 2 or 3 wherein R is methyl.

5. A compound as claimed in claim 1, wherein $R_1$ is selected from the group consisting of n-octyloxy and n-nonyl, R is methyl and Y is ethyl.

6. A ferroelectric smectic liquid crystal material, comprising a mixture of at least two compounds, wherein at least one of said compounds is a derivative as claimed in claim 1, 2 or 3.

* * * * *